United States Patent [19]
Dunk

[11] Patent Number: 5,863,121
[45] Date of Patent: Jan. 26, 1999

[54] AUTOMATIC STIRRING DEVICE FOR COOKING

[76] Inventor: William F. Dunk, 2207 Cumberland Ct., Smyrna, Ga. 30080

[21] Appl. No.: 943,625

[22] Filed: Oct. 3, 1997

[51] Int. Cl.⁶ ...................................................... B01F 7/16
[52] U.S. Cl. .......................... 366/286; 366/284; 366/282; 99/348
[58] Field of Search .................................. 366/249, 309, 366/242, 252, 254, 285, 286, 281, 282, 283, 284; 99/348

[56] References Cited

U.S. PATENT DOCUMENTS

| | | | |
|---|---|---|---|
| 2,170,280 | 4/1939 | Sharp | 366/244 |
| 3,357,685 | 12/1967 | Stephens | 99/348 |
| 3,783,770 | 1/1974 | Aries | 366/249 |
| 3,810,605 | 5/1974 | Lambert | 99/348 |
| 4,184,779 | 1/1980 | Detmer | 366/286 |
| 4,339,992 | 7/1982 | Kurland | 99/348 |
| 4,832,501 | 5/1989 | McCauley | 99/348 |
| 4,856,910 | 8/1989 | Cushera | 99/348 |
| 5,201,263 | 4/1993 | Teng | 99/348 |
| 5,497,695 | 3/1996 | Canela | 99/348 |
| 5,533,805 | 7/1996 | Mandel | 366/285 |
| 5,613,425 | 3/1997 | Krznaric | 99/348 |
| 5,765,947 | 1/1998 | Dubroy | 366/249 |

*Primary Examiner*—Tony G. Soohoo
*Attorney, Agent, or Firm*—William B. Noll

[57] ABSTRACT

Disclosure relates to a self stirring, automatic device to overlie a cooking vessel, during conventional or microwave oven cooking. The device hereof includes a protective housing containing a wound, coiled spring, rotary mechanism. Aditionally, there is provided an adjustable system for mounting the protective housing to a variety of different sized cooking vessels, and an adjustable stirring mechanism.

8 Claims, 4 Drawing Sheets

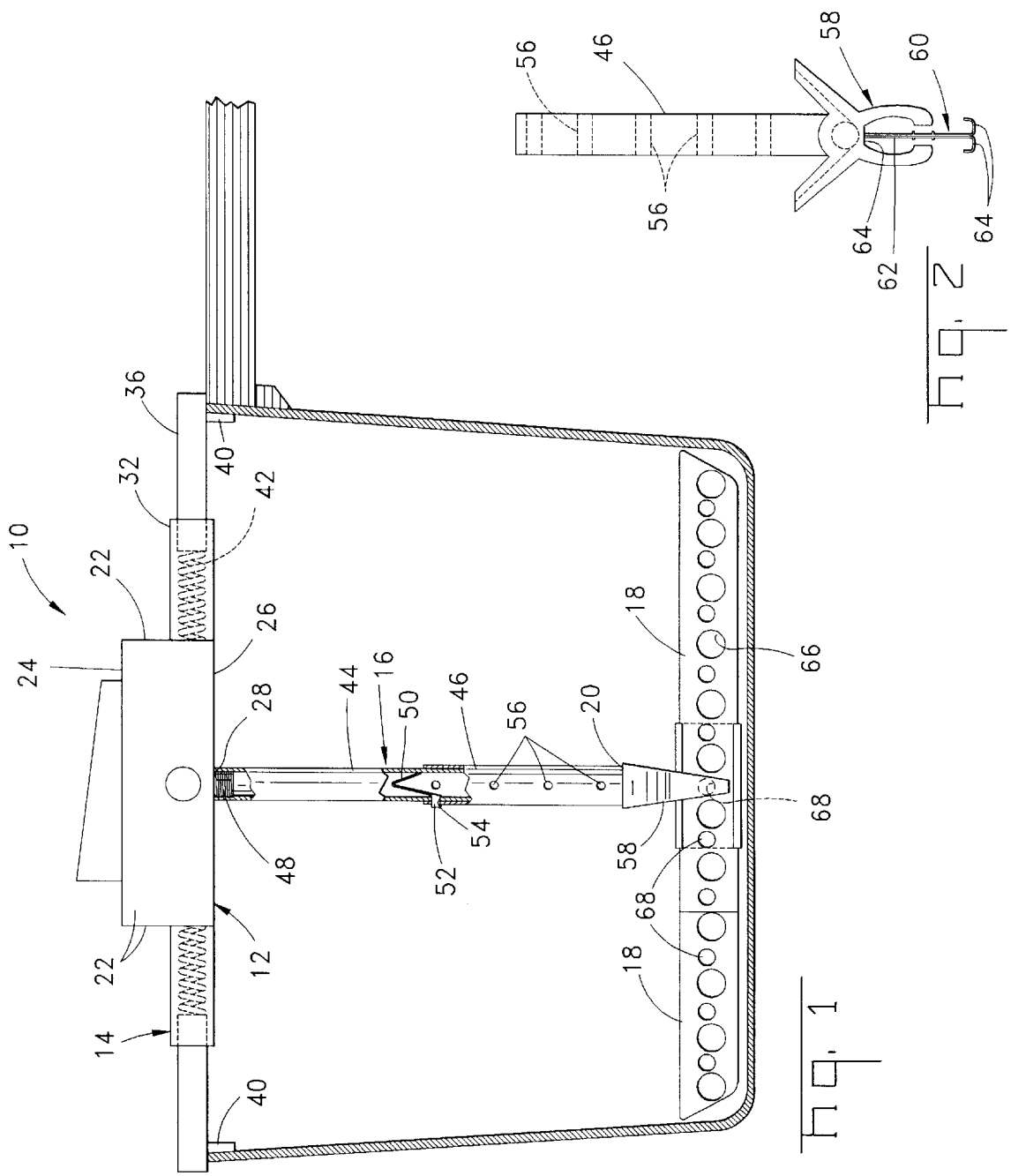

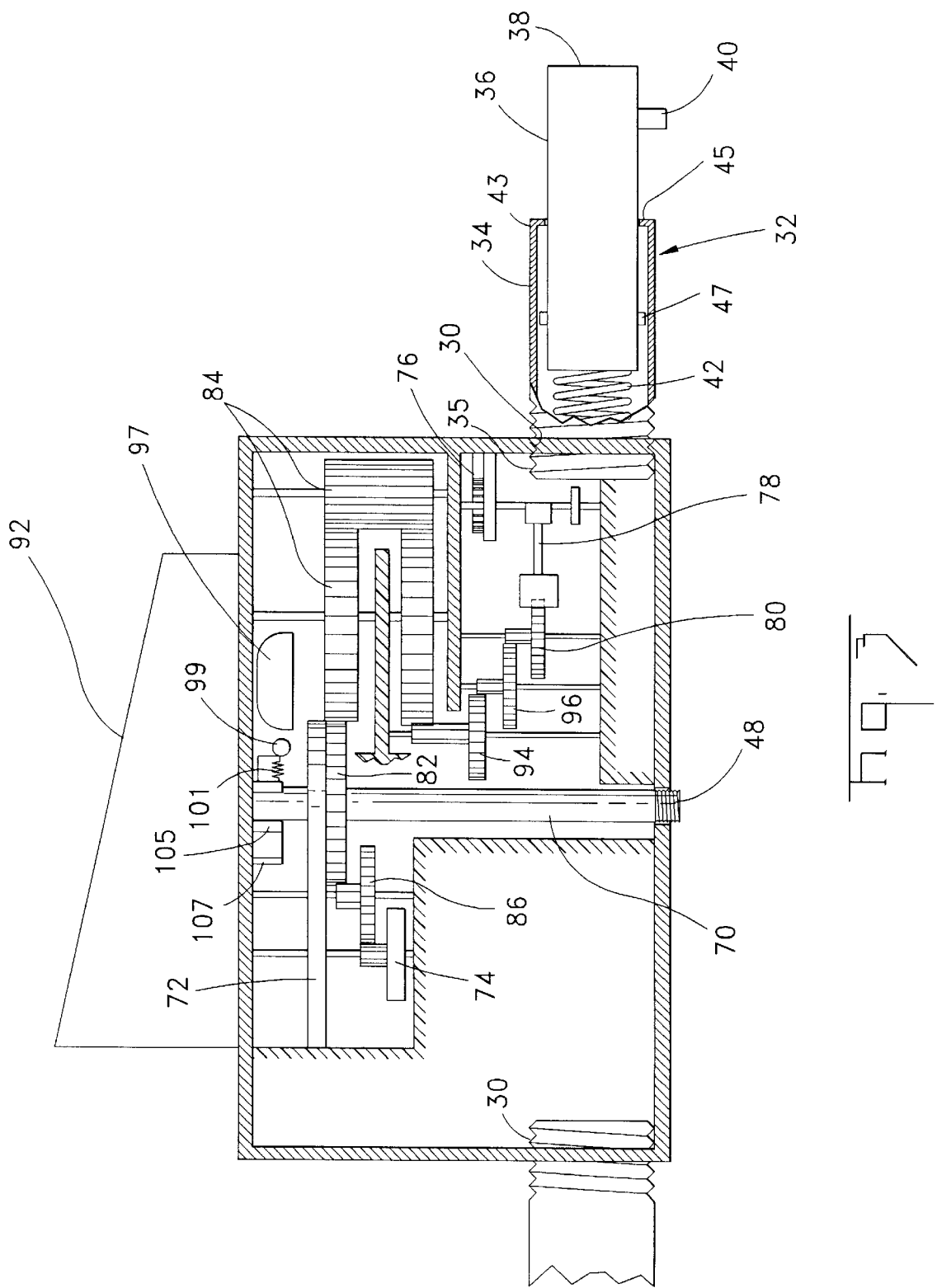

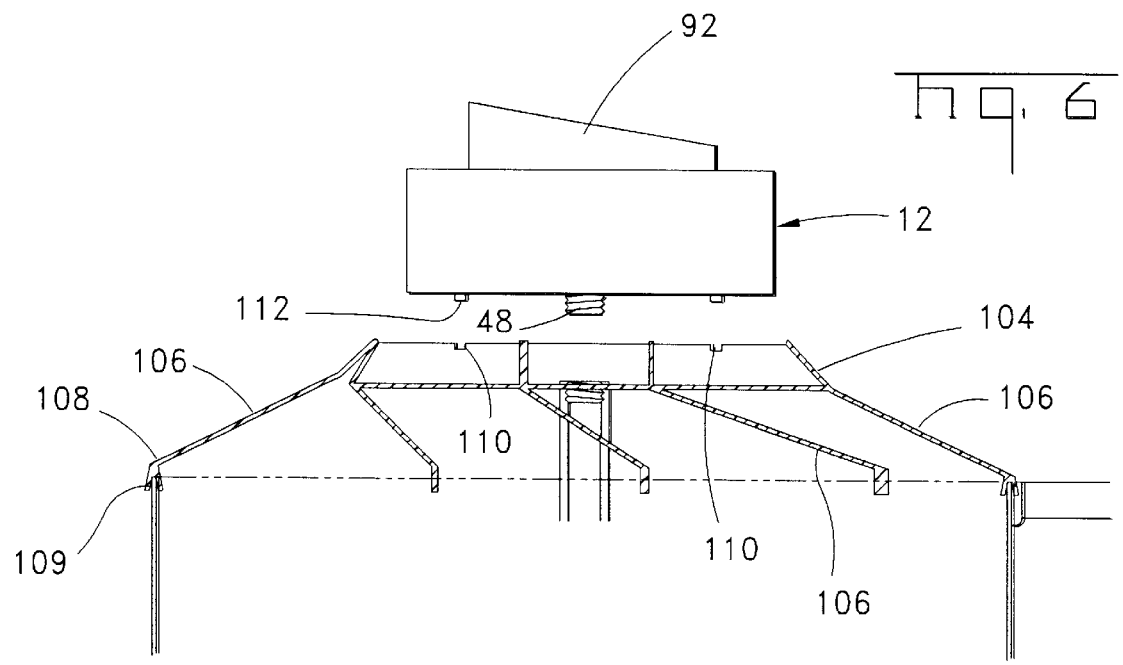
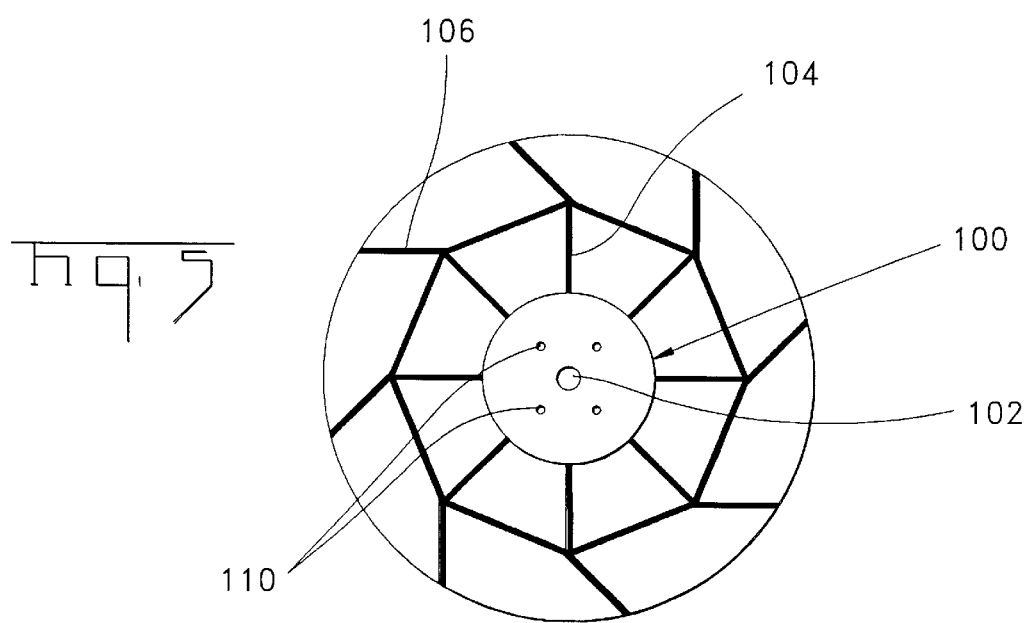

AUTOMATIC STIRRING DEVICE FOR COOKING

FIELD OF THE INVENTION

The invention relates to the field of self stirring devices for mounting to a cooking vessel.

BACKGROUND OF THE INVENTION

The present invention is directed to a self stirring, coiled spring powered, removably mounted device for application to a cooking vessel, while the contents thereof are stirred as it is heated. Such device is applicable to stove top cooking, as well as microwave cooking.

Careful manual mixing during cooking and/or heating of foods, such as soups, sauces, custards, pasta, etc. may be inadequate for a number of reasons, such as inattention due to other related cooking tasks, or attention to children. As a result, most people have seen the inside surfaces of cooking vessels contaminated, as after tiresomely long periods of required stirring, by part of the contents adhering inside and becoming difficult to remove, perhaps even charred from inadequate stirring and/or overheating.

Mechanically aided stirrers can reduce the effort, and often also the time needed to mix ingredients for cooked food products. However, such a mixing aid can induce a cook to increase heating temperature in an attempt, often misguided, to reduce the cooking time, or may lead to a period of inattention and consequent overexposure. Hence, sticking or burning of some of the contents on the side or bottom of the cooking vessel may result and prove difficult to remove, with extended clean up time, or may even contribute an undesirable flavor to the contents thereof.

In a search to find a means to assist the homemaker, the prior art reveals a number of attempts to find a solution. These attempts are described and illustrated in the following:

a) U.S. Pat. No. 4,959,517, to Jump et al., discloses a microwavable stirring device including a non-adjustable cover member containing a stirrer power assembly to be received onto a mixing bowl, for example.

b) U.S. Pat. No. 5,013,158, to Tarlow, discloses a stove top stirring device, which is mounted internally of the cooking container, where such device may incorporate a built-in alarm for indicating when the internal temperature of the vessel exceeds the boiling point of water so that water can be added. In this manner, the vessel can be automatically and continually stirred while steaming or simmering without danger of burning or overcooking.

c) U.S. Pat. No. 5,358,153, to Caldwell et al., discloses a mixing lid with a pouring device for containers used on stirring devices. The lid, among other features, includes an integral one piece slidable closure for a pouring spout having a first rearward opened pouring position, and a second forward closed sealed position.

d) U.S. Pat. No. 5,547,279, to Spitzer Sr., discloses stir-wipe apparatus in the form of a rotatable stirrer means fitting removably in a cooking vessel, which in combination with a non-manual drive means stirs the contents slowly and wipes the sidewall and bottom of the vessel. The drive means is conveniently an electric motor located on the lid for the cooking vessel, or in a handle of the lid or the vessel itself None of the foregoing prior art devices meet the needs of the homemaker, particularly the versatility of conventional and microwave cooking, where manual stirring of cooking foods is not convenient. The manner by which this is achieved in the present invention will become more apparent in the following description, particularly when read in conjunction with the accompanying drawings.

SUMMARY OF THE INVENTION

The present invention is directed to an automatic stirring device for cooking, whether by conventional stove top or microwave cooking, where the rotary mechanism is enclosed within a protective plastic housing to protect against steam and heat, and/or microwave oven emissions. The rotary mechanism is mounted to an adjustable system overlying the cooking vessel, where two embodiments are disclosed, to accommodate different sized cooking vessels. Additionally, a telescopic rotary shaft is disclosed to ensure proper positioning of a pair of adjustable mixing blades in close proximity to the vessel bottom.

Accordingly, an object of this invention is the provision of a versatile cooking aid for conventional stove top cooking, or microwave cooking, where constant manual stirring of cooking foods is not a viable option.

Another object hereof is a single, automatic stirring device that is adaptable to a variety of sizes of cooking vessels.

A further object lies in a device that requires no electrical source for powering, but rather relies on a wound coiled spring for stirring.

These and other objects will become apparent to those skilled in the art from the following specification.

BRIEF DESCRIPTION OF THE DRAWINGS

FIG. 1 is a plan view of a first embodiment of the mounting means, with parts removed to reveal hidden details, showing the automatic stirring device according to this invention.

FIG. 2 is a partial side view of the adjustable stirring blade, adaptable to effect stirring in a variety of different sized cooking vessels, of this invention.

FIG. 3 is a side sectional view showing the mechanical, rotary stirring mechanism hereof, within a housing, for positioning over a cooking vessel.

FIG. 5 is a top plan view of a second embodiment for adjustably mounting to a cooking vessel, showing an alternate system for positioning the automatic stirring device of this invention.

FIG. 6 is an exploded side view of the second embodiment of FIG. 5 showing the propositioned automatic stirring device hereof

DETAILED DESCRIPTION OF PREFERRED EMBODIMENTS

Figure 4:
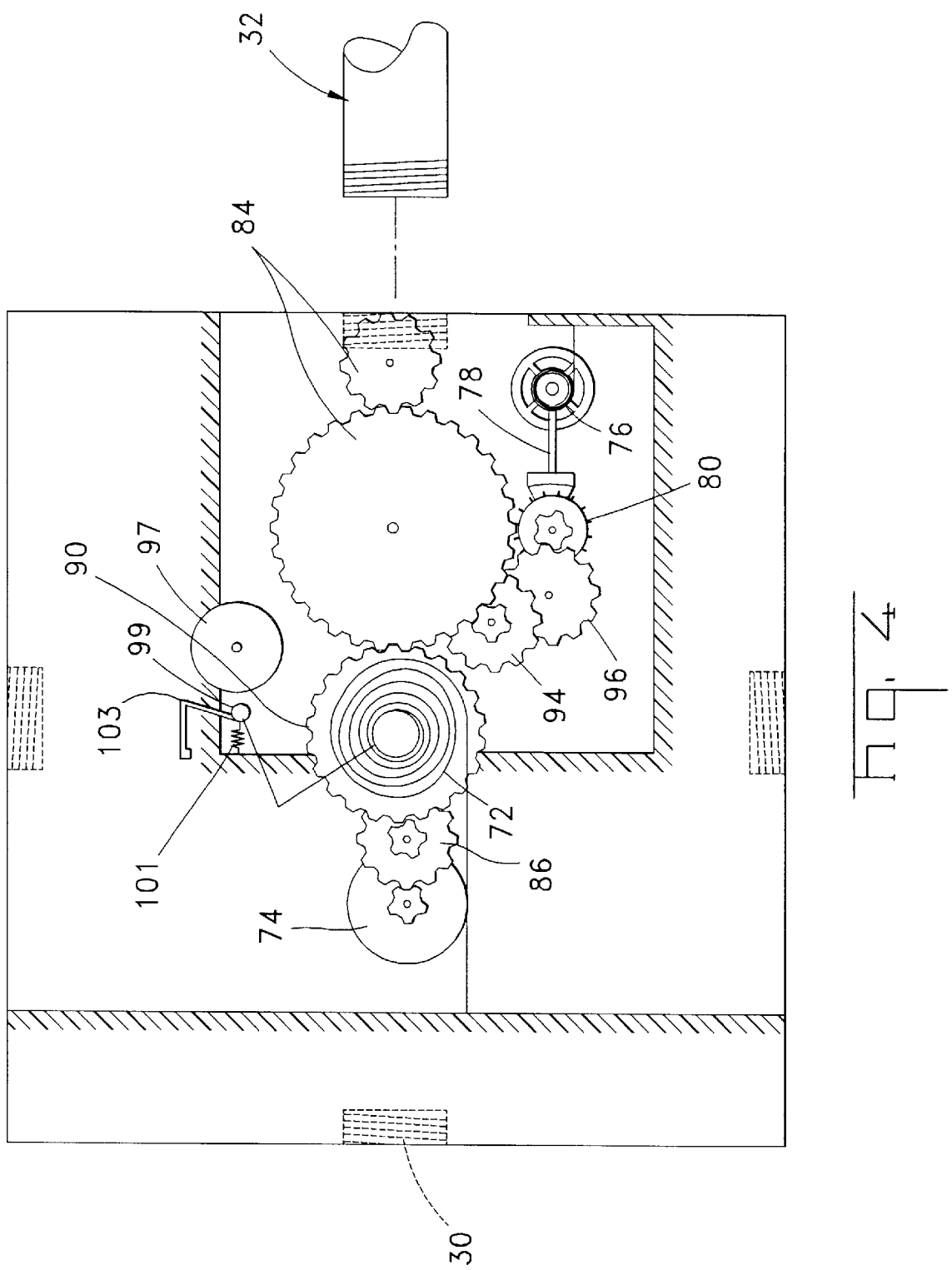
FIG. 4 is a top plan view of the mechanical, rotary stirring mechanism of FIG. 3, with the housing cover removed.

The present invention is directed to an automatic, self stirring device for stove top and microwave oven cooking, as illustrated in the several Figures, where like reference numerals identify like components or features throughout the various views.

FIG. 1 illustrates a first embodiment of the stirring device 10 of this invention, where such device is shown removably mounted over a cooking pot. The device comprises a housing 12, a mounting system 14 to support said housing 12, a downwardly extending rotating shaft 16, and a pair of laterally extended, adjustable mixing blades 18 removably attached to the distal end 20 of shaft 16.

The housing 12, generally rectangular in configuration and fabricated from a high temperature resistant plastic, such as high density polyethylene, comprises four upstanding side walls 22, a top wall 24, and a bottom wall 26, where said bottom wall includes a central opening 28 communicating with the interior thereof. Further, the respective side walls 22 include threaded recesses 30 into which components of the mounting system 14 are received.

A first embodiment of the mounting system 14 preferably comprises four individually, extendable, telescopic arms 32. Each said arm includes a first arm segment 34, threaded at one end 35 thereof for engaging a complementary threaded recess 30 in the housing side wall, and a second arm segment 36 slidably received within said first arm segment 34. The distal end 38 of said second arm segment may include a downwardly projecting stop member 40, fabricated from rubber, for example, for engaging the periphery of the cooking pot when in the extended position. Biasing the second arm segment and stop member 40 against the cooking pot is an internal compression spring 42. As best seen in FIG. 3, the outer end 43 of the first arm may be provided with an inwardly directed annular flange 45. Cooperating with said flange 45 is an annular rim or stop 47 about the second arm 36 to prevent it from prematurely releasing from the first arm 34. By this arrangement, the housing 12 may be centrally disposed over a variety of sized circular or rectangular cooking pots.

The rotating shaft 16 and adjustable mixing blades 18 are best illustrated in FIGS. 1 and 2. In order to position the blades in close proximity to the bottom of the cooking pot, the rotating shaft 16 preferably comprises a pair telescopically engaged upper and lower shaft segments 44, 46, respectively. A first end of upper shaft segment 44 is internally threaded to engage threaded stub 48, the external rotary member extending from the power source within the housing 12 and extending through opening 28. The opposite end is provided with an internally positioned, V-shaped plastic latching member 50, wedged therewithin, where one end thereof includes a nibble 52 communicating exteriorly thereof through an opening 54. Slidably engaging the opposite end is lower shaft segment 46, where said segment includes a series of openings 56. These openings 56 cooperate with the latching member 50 to axially position the respective shaft segments to the desired length. The free or distal end of lower shaft segment 46 is provided with a spring biased clip 58 having a blade support 60 extending downwardly through the bite thereof, FIG. 2. The blade support 60 includes a central wall 62 having a pair of outwardly curved flange members 64, where the respective flanges along each side at wall 62 define a channel for slidably receiving a mixing blade 18. By this arrangement, the blades may be positioned to a depth desired, then laterally extended or retracted, as desired, and locked by the clip 58, to precisely fit the cooking pot. The blades 18, as best seen in FIG. 1, include a first series of larger holes 66 to facilitate mixing, and a series of smaller holes 68 for selectively engaging the clip 58.

FIGS. 3 and 4 are, respectively, side and plan views of the interior of the housing 12 showing primarily the gear mechanism for rotating the main shaft 70, an extension of threaded stub 48. The rotating mechanism includes a coiled, torsional spring 72 wound about and connected to said main shaft 70, and a rubber speed control mechanism 74 to constrain or ensure the torsional spring 72 rotates at a designated rate. Otherwise, the spring would unwind immediately. The half spring 76 is an important component of the timer or rotating mechanism. This half spring 76 winds as the pendulum like pallet 78 moves one way and then unwinds forcing the pallet 78 to move the other direction. The balance thereof keeps the oscillary motion initiated by the spring 76 and pallet 78 constant. The pallet 78, like a pendulum, moves one direction as the escape wheel 80 rotates and then releases the wheel. As this sequence occurs, the other end of the pallet 78 rotates the shaft which loads the half spring 76. In return, the half spring unwinds causing the pallet 78 to move in the other direction so that it engages the escape wheel again. This sequence of steps causes the escape wheel 80 to revolve once every eight seconds, which is the key to keeping accurate time. The main gear 82 is attached to the spring 72 which turns the gear 82 at a rate of one revolution every four seconds, which in turn is coordinated by the adjacent torque and timing gear trains 84, 86, respectively. The center wheel 90 rotates every 20 minutes to give validity to the manual rotary timer dial 92. By this arrangement, the rotary mechanism provides a 300:1 ratio of teeth between the center wheel 90 and the main gear 82 so that the center wheel revolves once per twenty minutes and the main gear 82 revolves once per four seconds. The torsional gear 86, toward the left of the respective figures, acts as an intermediate between the main gear 82 and the rubber speed control wheel 74. The satellite wheels 94, 96 function to transfer a slow angular rotation to the center wheel 90 to a fast revolution of the escape wheel 80.

To assist a non-attendant homemaker in using the stirring device of this invention, an alarm device may be incorporated into the system hereof. For example, when the stirring device runs down, a bell 97, rung by the mallet 99, may be provided. The spring 101 (FIG. 3) is loaded when the flexible pivot 103 pulls the mallet 99 back. The spring loads when the time expires forcing the mallet to strike the bell 97. The flexible pivot 103 (FIG. 4) pulls the mallet back (to load the spring) when the main shaft 70 is turned from its initial position via component 105, which enlarges the radius of the shaft. Once the main shaft rotates back to its initial position, i.e., signifying the expiration of time, the radius decreases by cam washer 107, releasing the flexible pivot 103 which in turn unleashes the spring and mallet.

A second embodiment for the mounting system for positioning the housing 12 of this invention is illustrated by the two views of FIGS. 5 and 6. The modified mounting system comprises a central mounting plate 100, having a central opening 102 for receiving the threaded stub 48, as noted above. Emanating from the mounting plate 100 is an inner network of connected leg segments 104 having a plurality of free legs 106 radially and angularly extending therefrom. The distal ends 108 of said free legs 106 may include a V-shaped, rubberized foot 109 to secure the network about the rim of the cooking pot. The network, including the free legs 106, being fabricated from a high temperature resistant plastic, is sufficiently flexible to shift such legs to accommodate different dimensioned cooking vessels. Finally, to position and fix the housing 12 the mounting plate 100, plural apertures 110 may be provided to receive complementary feet 112 extending from the housing base.

Recognizing that exposed metal parts heated in a microwave oven can cause serious damage, the device hereof uses a heat resistant plastic, up to 500 degrees F., that protects all metal parts, such as the stainless steel springs.

While two embodiments have been described above on the mounting system, it is recognized that variations may be had with respect to the components hereof. Therefore, while the invention has been disclosed in preferred forms only, it will be obvious to those skilled in the art that many additions, deletions and modifications can be made therein without departing from the spirit and scope of this invention, and that no undue limits should be imposed thereon except as set forth in the following claims.

I claim:

1. An automatic stirring device removably attached to a cooking vessel during cooking within said vessel, said device comprising, a. a wound, coiled spring, rotary mechanism mounted within a protective housing, with rotary means accessible through said housing;

b. a telescopically adjustable shaft extending from and engaging said rotary means, and mounting a pair of adjustable mixing blades at the distal end thereof, where said telescopically adjustable shaft includes a second member for temporarily securing therewithin, and said second member includes a distal end having a spring biased latch for temporarily mounting said mixing blades; and c. a mounting system for said protective housing for adjustably mounting said system to the periphery of said cooking vessel.

2. The automatic stirring device according to claim 1, wherein said rotary means is a threaded member for threadably engaging said telescopically adjustable shaft.

3. The automatic stirring device according to claim 1, wherein said protective housing is a plastic capable of resisting temperatures up to about 500 degrees F.

4. The automatic stirring device according to claim 1, wherein said mounting system includes plural arms extending laterally from said protective housing, each said arm including inner and outer telescopically engaging members.

5. The automatic stirring device according to claim 4, wherein said outer member of each said arm includes a projection therefrom for engaging the periphery of said cooking vessel.

6. The automatic stirring device according to claim 5, wherein each said arm includes a compression spring for biasing said outer member against said cooking vessel.

7. The automatic stirring device according to claim 1, wherein said mounting system includes a circular network of interconnecting plastic leg members, a mounting platform in the middle of said circular network for mounting said protective housing, and plural, radially and angularly extending plastic legs connected to said network, where the distal ends of said legs are arranged to removably attach to said cooking vessel.

8. The automatic stirring device according to claim 7, wherein said distal ends each include a rubberized V-shaped member to override the periphery of said cooking vessel.

\* \* \* \* \*